(12) United States Patent
Imura et al.

(10) Patent No.: US 9,077,223 B2
(45) Date of Patent: Jul. 7, 2015

(54) ELECTRICAL ROTATING MACHINE

(71) Applicant: Hitachi, Ltd., Chiyoda-ku, Tokyo (JP)

(72) Inventors: Makoto Imura, Tokyo (JP); Tomohiro Naruse, Tokyo (JP); Motonobu Iiduka, Tokyo (JP); Shigeki Nakae, Tokyo (JP); Takeshi Mori, Tokyo (JP); Takayuki Koyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/269,820

(22) Filed: May 5, 2014

(65) Prior Publication Data

US 2014/0333174 A1  Nov. 13, 2014

(30) Foreign Application Priority Data

May 10, 2013  (JP) ................................. 2013-100175

(51) Int. Cl.
  *H02K 1/28*  (2006.01)
  *H02K 1/24*  (2006.01)

(52) U.S. Cl.
  CPC ........................................ *H02K 1/24* (2013.01)

(58) Field of Classification Search
  CPC .................................................... H02K 3/527
  USPC ................... 310/216.107, 216.125, 216.126, 310/216.127, 156.59, 156.61, 194
  See application file for complete search history.

(56) References Cited

U.S. PATENT DOCUMENTS

| 668,194 | A | * | 2/1901 | Lamme | 310/269 |
|---|---|---|---|---|---|
| 2,621,223 | A | * | 12/1952 | Valentine et al. | 310/265 |
| 2,655,613 | A | * | 10/1953 | Wieseman | 310/194 |
| 3,089,049 | A | * | 5/1963 | Sills | 310/269 |
| 4,459,502 | A | * | 7/1984 | El-Antably | 310/184 |
| 4,990,810 | A | * | 2/1991 | Newhouse | 310/194 |
| 8,631,961 | B2 | | 1/2014 | Naruse et al. | |

FOREIGN PATENT DOCUMENTS

| DE | 2410546 A1 | * | 11/1995 |
|---|---|---|---|
| DE | 4415224 A1 | * | 11/1995 |
| JP | 50-155505 U | | 12/1975 |
| JP | 54-175503 U | | 12/1979 |
| JP | 2010-255459 A | | 11/2010 |
| JP | 2013-249771 A | | 12/2013 |
| WO | WO 8704021 A1 | * | 7/1987 |

* cited by examiner

*Primary Examiner* — Naishadh Desai
(74) *Attorney, Agent, or Firm* — Crowell & Moring LLP

(57) ABSTRACT

An electrical rotating machine is provided with a salient-pole rotor, which is composed of magnetic field pole bodies integrally formed with a shaft and pole shoes constituting magnetic field pole heads. Each pole shoe is fixedly joined on the corresponding one of the magnetic field pole bodies with a plurality of bolts. Each pole shoe or its corresponding magnetic field pole body is provided with at least one protrusion or recess for restricting a conically-shaped compression domain in a compression domain that occurs in the pole shoe when the pole shoe is joined on the corresponding magnetic field pole body with the bolts.

3 Claims, 14 Drawing Sheets

ELECTRICAL ROTATING MACHINE

CROSS-REFERENCE TO RELATED APPLICATION

This application claims the priority of Japanese Patent Application 2013-100175 filed May 10, 2013, which is incorporated herein by reference.

BACKGROUND OF THE INVENTION

1. Field of the Invention

This invention relates to an electrical rotating machine of the revolving-field type, in which magnetic field pole heads and magnetic field pole bodies are fixed together by bolted joints.

2. Description of the Related Art

A synchronous machine is an electrical rotating machine that can realize a large output compared with an induction machine. In recent years, the inverter driving method has been developed so that such synchronous machines can be operated at a desired optional power factor. Especially in regard to synchronous machines for hydroelectric power plants, oil plants, gas plants and the like, there is hence an increasing move toward synchronous machines of larger capacity.

Synchronous machines include two types, one being the revolving-armature type, and the other the revolving-field type. The revolving-field type is the type that a rotor provided with magnetic field poles rotates relative to a stator with armature windings wound thereon. The revolving-armature type outputs an armature current via slip rings, and therefore, involves the wearing of contact portions as a problem. On the other hand, the revolving-field type is free of such a problem, and can simplify the routing of wires. The use of the DC energization method allows the revolving-field type to employ a direct current as its field current so that the magnetomotive force of field windings can be increased even at a low voltage. The revolving-field type which is the subject of the present invention has, therefore, become mainstream in recent years.

In FIGS. 1 and 2, one example of conventionally-known revolving-field type rotors is shown. FIG. 1 is a perspective view of the conventionally-known revolving-field type rotor, and FIG. 2 is a cross-sectional view of the conventionally-known revolving-field type rotor. In the rotor 1 of this example, four magnetic field poles are formed at equal angular intervals around a shaft 1c. Like this rotor 1, at least two or greater even number of magnetic field poles are formed on a revolving-field type rotor. Rotors of a shape that as appreciated from FIG. 2, tip ends of the respective magnetic field poles outwardly project as many as the number of the magnetic field poles are collectively called "salient-pole rotors".

A shaft body 1b of a square shape in cross-section is formed on a longitudinally central part of the shaft 1c, and on the shaft body 1b, four magnetic field pole bodies 1a that make up shanks of the magnetic field poles are formed. On an outer wall of each magnetic field pole body 1a, a pole shoe 2 that makes up a head of the corresponding magnetic field pole is joined with plural bolts 3. Described specifically, for the bolts 3, a like plural number of through-holes are formed through the pole shoe 2, and threaded hole machining has been applied a like plural number of times to the magnetic field pole body 1a at locations corresponding to the through-holes to form threaded holes. By bringing the bolts 3, which have been inserted in the through-holes, into threaded engagement with the threaded holes, the pole shoe 2 is joined to the magnetic field pole body 1a. Bolted joint portions of each magnetic field pole, where the pole shoe 2 is fixed on the magnetic field pole body 1a, are aligned in at least two parallel rows such that the bolted joint portions are symmetrically located with respect to a central axis of the shaft 1c. Further, a coil 4 is arranged on and around outer periphery of each magnetic field pole body 1a in a space between an outer wall of the shaft body 1b and an inner wall of the pole shoe 2.

Incidentally, centrifugal forces are applied to each bolted joint portion of the rotor 1 during rotation of the rotor 1. As illustrated in FIG. 3, centrifugal forces $F_1$, $F_2$, $F_c$ that are applied to each bolted joint portion of the rotor 1 act in the axial direction of the bolt 3 and, because the acting points of the centrifugal forces $F_1$, $F_2$, $F_c$ deviate from the axial centerline of the bolt 3, moments $M_1$, $M_2$, $M_c$ act on the bolted joint portion. Therefore, on the bolt 3, a pulling stress occurs in the axial direction of the bolt 3, and a bending stress also occurs by the moments $M_1$, $M_2$, $M_c$.

As shown in FIG. 1, each pole shoe 2 is joined on the corresponding magnetic field pole body 1a with the plural bolts 3. As illustrated in FIG. 4, on an outer side as viewed in a direction perpendicular to an axis of rotation, in other words, on a widthwise outer side of the bolted joint portions of the pole shoe 2, the pole shoe 2 tends to come loose upward from the magnetic field pole body 1a under centrifugal forces, and hence, to result in a phenomenon that the magnetic field pole body 1a and the pole shoe 2 separate from each other at the plane of a joint therebetween. Such a phenomenon becomes more pronounced as the revolution speed required for the electrical rotating machine becomes higher or the overall lengths of the magnetic field pole bodies 1a and pole shoes 2 arranged on the rotor 1 become longer.

When desired to provide a synchronous machine with a large capacity, the rotor 1 may be made longer in the longitudinal direction of the axis of rotation while keeping the same its cross-section perpendicular to the axis of rotation instead of enlarging the cross-section. When the ratio of the axial length to the diameter of the rotor 1 increases, the pole shoe 2 undergoes a greater bending deformation as the distance from its central part increases toward its opposite ends, and therefore, greater bending stresses occur at the bolted joint portions in opposite end portions than at the remaining bolted joint portions.

In a salient-pole rotor, the outer wall of each magnetic field pole is configured such that a magnetic gap becomes larger toward opposite longitudinal ends of the magnetic field pole to make a magnetic flux distribution closer to a sinusoidal waveform. This configuration is effective for reducing harmonics that occur in an induced electromotive force. The centrifugal force to be borne per bolted joint portion, however, becomes greater at both the end portions of the pole shoe 2 as indicated at areas surrounded by solid lines in FIG. 6 compared with at its central part. The pole shoe 2, therefore, undergoes a bending deformation at both the end portions thereof such that it curls up there, leading to a reduction in the magnetic gap to be maintained between the rotor and the stator during operation of the synchronous machine. The occurrence of such a phenomenon also becomes a cause of torque pulsation by harmonics in an induced electromotive force, and therefore, gives not a small influence to the output efficiency.

In general, each bolted joint portion is strong against a pulling force in the axial direction of the bolt 3 but is weak against a force or moment deviating from the axial centerline of the bolt 3, because a bending stress tends to concentrate at the thread groove of the bolt 3. When the pole shoe 2 is sufficiently higher in stiffness than the bolts 3, the centrifugal forces $F_1$, $F_2$, $F_c$ and moments $M_1$, $M_2$, $M_c$ are mostly borne by the pole shoe 2 until the magnetic field pole body 1a and the pole shoe 2 separate from each other at the plane of the joint therebetween. When the revolution speed increases and the separation takes place, however, the loading factor of each bolt 3 increases so that the bolt 3 may fracture.

To provide a revolving-field type synchronous machine with a large capacity, the rotor 1 needs to be enlarged. However, the enlargement of the rotor 1 leads to increases in the centrifugal forces $F_1$, $F_2$, $F_c$ and centrifugal forces $F_1$, $F_2$, $F_c$, and therefore, the magnetic field pole body 1a and the pole shoe 2 become prone to separation from each other at the plane of the joint therebetween and the bolts are required to bear increased centrifugal forces and moments. For providing a revolving-field type synchronous machine with a large capacity, it is thus important to ensure high strength reliability of bolted joint portions in a salient-pole rotor.

As a measure to meet such a requirement, JP-A-50-155505 [U] discloses in FIG. 1 a technology that a rectangular protrusion is formed on a lower wall of each magnetic field pole head with the same height over the entire length of its corresponding magnetic field pole shank and a lower wall of the protrusion is joined to an upper wall of the magnetic field pole shank. According to this technology, the magnetic field pole head can be provided with improved bending stiffness, and therefore, a bending stress which is to act on each bolt can be reduced. In addition, JP-A-50-155505[U] also discloses in FIG. 1 a technology that each magnetic field pole head is beveled at longitudinal opposite end portions thereof to define inclined surfaces. According to this technology, the magnetic field pole head can be reduced in mass at the longitudinal opposite end portions thereof, thereby making it possible to reduce bending stresses and bending moments that are to act on bolts arranged at and around the longitudinal opposite end portions.

On the other hand, JP-A-54-175503 [U] discloses in FIGS. 3 to 5 a technology that a protrusion is formed on a lower wall of each magnetic field pole head on a periphery of bolted joint portions. According to this technology, the protrusion is limited only to the periphery of the bolted joint portions so that the increase in the mass of the magnetic field pole head can be reduced compared with the rotor described in JP-A-50-155505 [U].

SUMMARY OF THE INVENTION

However, the technology described in JP-A-50-155505 [U] makes a lower side of each magnetic field pole head uniformly protrude at the same height over the entire length thereof in the longitudinal direction of an axis of rotation, and therefore, the mass of the magnetic field pole head itself increases accordingly. As a result, each bolted joint portion is required to bear an increased centrifugal force in an axial direction of the bolt. To cope with this problem, it may be contemplated, for example, to increase the number of bolts or to make the bolts thicker. However, these approaches make the bolted joint portions be located close to each other and are not preferred, although it is possible to reduce centrifugal forces to be borne at the bolted joint portions.

Described specifically, if the bolted joint portions are located excessively close to each other, high stresses occur at narrow portions flanked by bolted joint portions b1 and b2 in the pole shoe 2 as illustrated in FIG. 5, thereby raising a potential problem that such an excessively close arrangement of bolted joint portions may lead to a reduction in the strength of the pole shoe 2. Further, the longitudinally opposite end portions of the pole shoe 2 are formed thinner to reduce centrifugal forces as mentioned above. Therefore, large stresses occur there to heighten the possibility that the pole shoe 2 may break.

To solve the above-described problems, an object of the present invention is to provide an electrical rotating machine provided with a salient-pole rotor which can surely avoid fracture of bolts and breakage of pole shoes under centrifugal forces even when increased in capacity and operated at high revolution speeds.

To achieve the above-described object, the present invention is characterized in that in an electrical rotating machine provided with a salient-pole rotor composed of magnetic field pole bodies integrally formed with a shaft and pole shoes constituting magnetic field pole heads, each pole shoe being fixedly joined on the corresponding one of the magnetic field pole bodies with a plurality of bolts, each pole shoe or its corresponding magnetic field pole body is provided with at least one protrusion or recess for restricting a conically-shaped compression domain in a compression domain that occurs in the pole shoe when the pole shoe is joined on the magnetic field pole body with the bolts.

According to the present invention, it is possible to avoid an increase in the mass of whole pole shoes and also to avoid the fracture of bolts or the breakage of the pole shoes, so that a salient-pole rotor of higher strength and longer service life can be realized. Moreover, bending deformations of the pole shoes can be reduced. Therefore, a reduction effect can be expected for torque pulsation during operation of a synchronous machine to improve the power efficiency to not a little extent, and a large-capacity and high-efficiency synchronous machine can be realized.

DETAILED DESCRIPTION OF PREFERRED EMBODIMENTS

A description will first be made of the configuration of an electrical rotating machine, to which the present invention is applicable. This electrical rotating machine is a synchronous machine provided with a salient-pole rotor.

Figure 7:
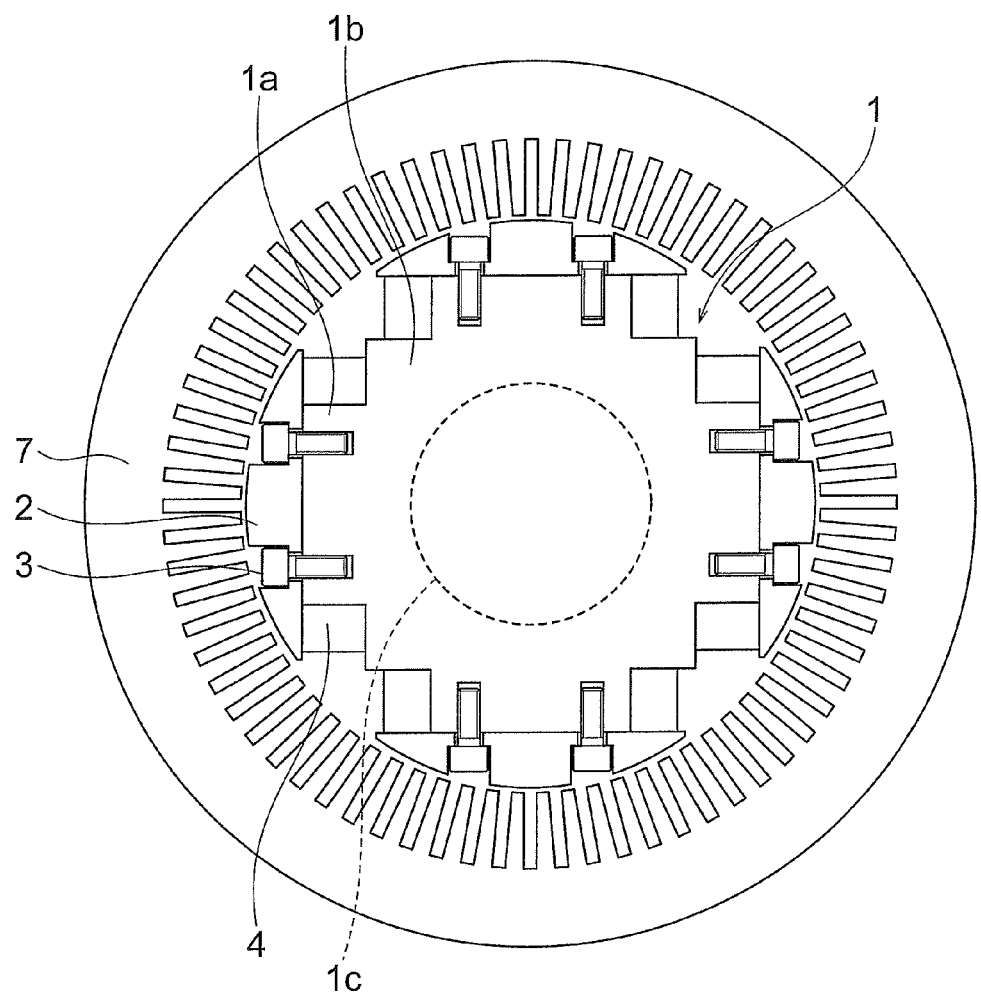
FIG. 7 is a cross-sectional view, taken along a plane perpendicular to an axis of rotation, of an electrical rotating machine of conventional configuration.

As depicted in FIG. 7, the electrical rotating machine, to which the present invention is applicable, is generally constructed of a rotor 1 on a rotating side and a stator 7 on a stationary side. The rotor 1 is of the revolving-field type that includes a plurality of magnetic field poles, specifically a salient-pole rotor. A description will hereinafter be made taking, as an example, a case in which four magnetic field poles are formed. However, the gist of the present invention is not limited to such an electrical rotating machine, but can be applied to all electrical rotating machines the magnetic field poles of each of which consist of an even number of magnetic field poles other than 4 magnetic field poles.

The rotor 1 is a salient-pole rotor with pole shoes 2, which make up the heads of respective magnetic field poles and project on the side of an outer periphery of the rotor 1. The magnetic field pole bodies 1a, which make up shanks of the respective magnetic field poles, are integrally formed on a shaft body 1b, which is in turn formed integrally with a shaft 1c. In spaces formed by outwardly extending widthwise opposite sides of the pole shoes 2 from the corresponding magnetic field pole bodies 1a, copper-made coils 4 are arranged. Each coil 4 can be in the form of a block or a stack of thin sheets. Each magnetic field pole body 1a and its corresponding coil 4 are divided by an unillustrated thin sheet made of an insulating material to insulate a field current, which flows through the coil 4, from the magnetic field pole body 1a.

The pole shoes 2 are constructed such that, when seen on a cross-section perpendicular to the axis of rotation, they have an arcuate shape to form an outer surface of the rotor 1 and have the same cross-section in the longitudinal direction of the axis of rotation. The field current of a synchronous machine may be DC electricity, which is smaller in loss than AC electricity. Accordingly, each pole shoe 2 may have a single block structure in the former case, or may have a structure with magnetic steel sheets stacked in the longitudinal direction of the axis of rotation.

Figure 1:
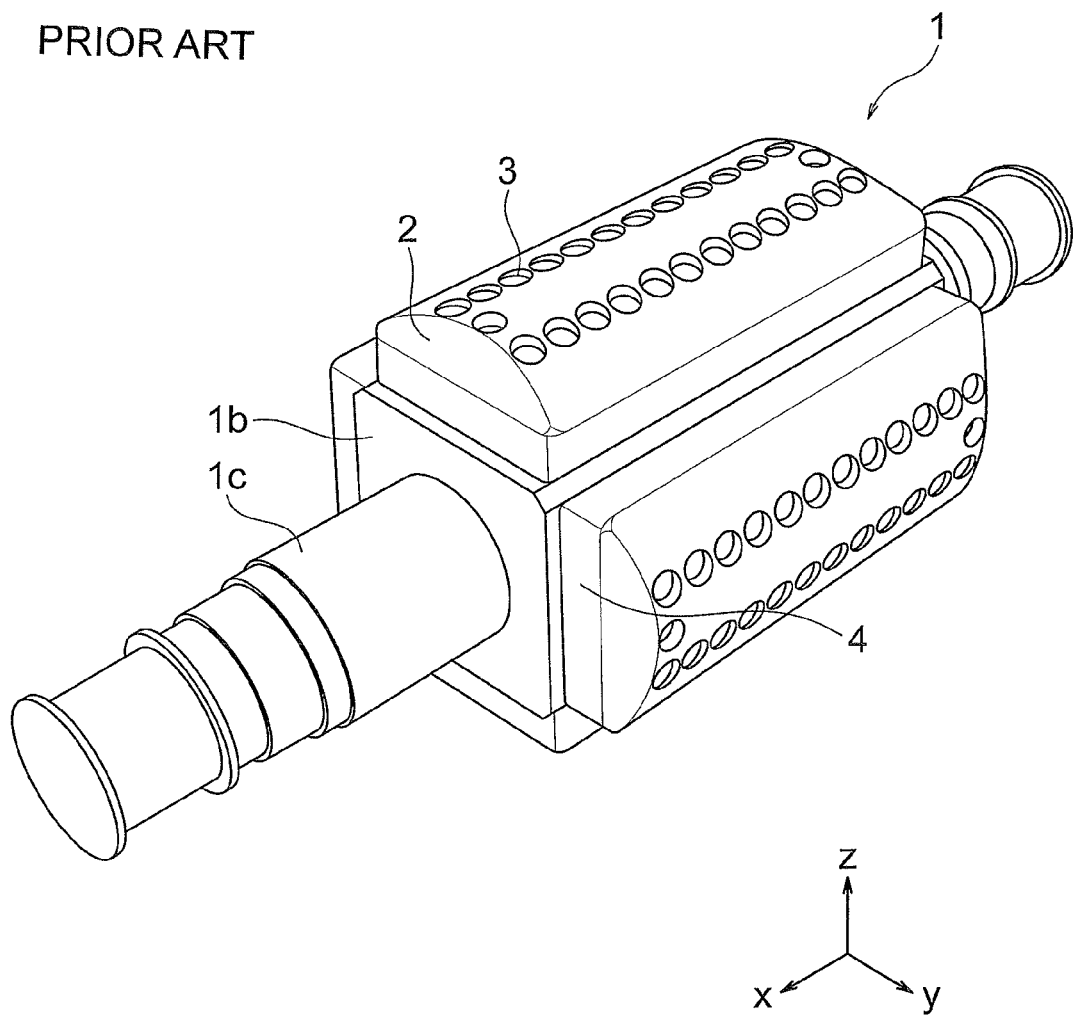
FIG. 1 is a perspective view of a conventionally-known salient-pole rotor.
Figure 2:
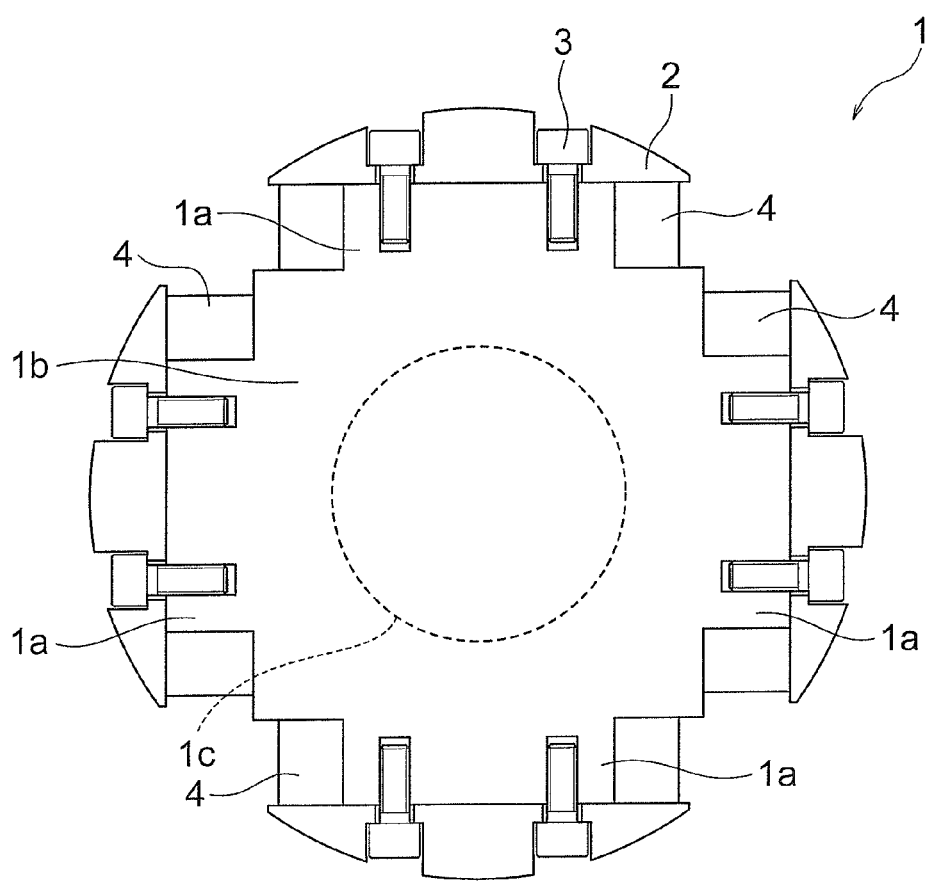
FIG. 2 is a cross-sectional view, taken along a plane perpendicular to an axis of rotation, of the salient-pole rotor.
Figure 2:
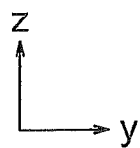
Figure 3:
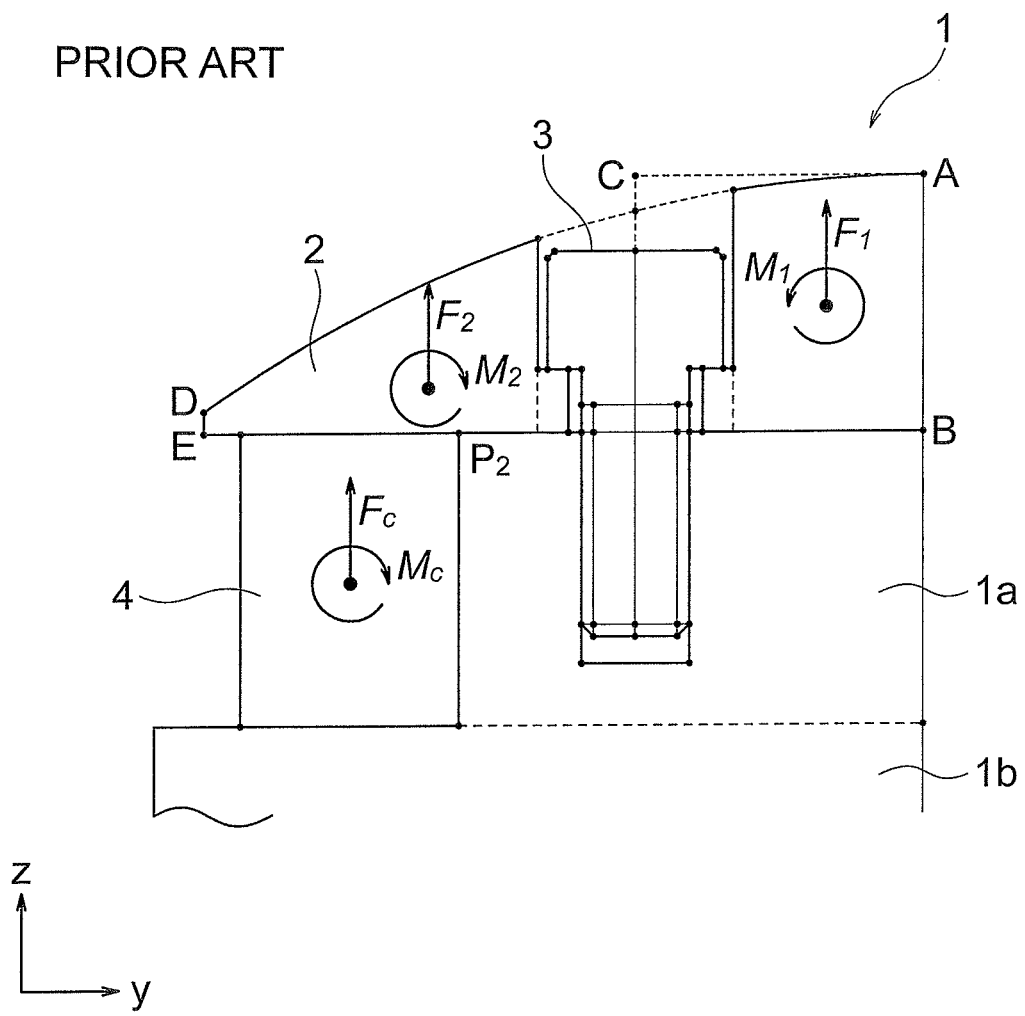
FIG. 3 is a diagram illustrating the distribution of centrifugal forces acting on respective barycentric points in the rotor during rotation.
Figure 4:
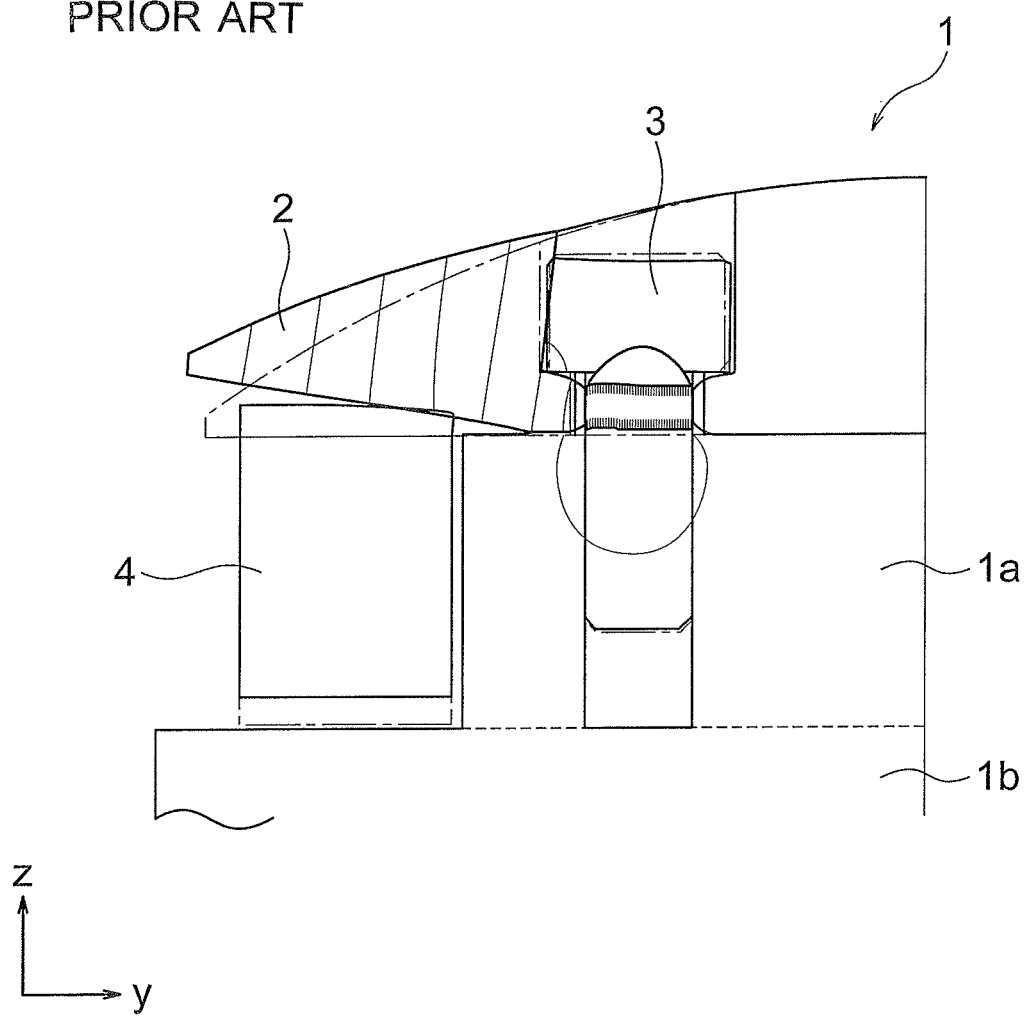
FIG. 4 is a diagram schematically illustrating a deformation in a widthwise direction of each pole shoe in the rotor of during rotation.
Figure 5:
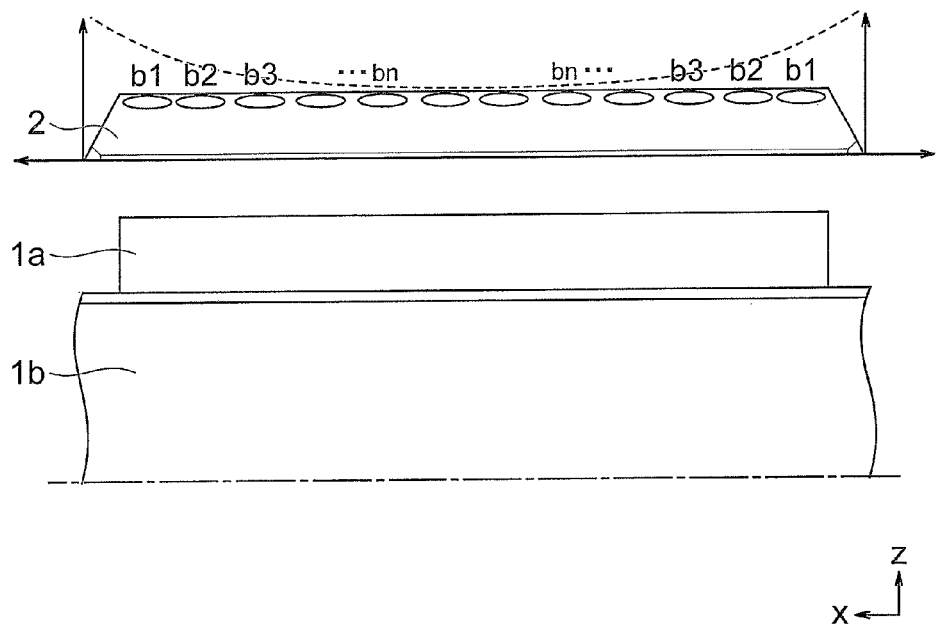
FIG. 5 is a diagram schematically illustrating a deformation in a longitudinal direction of each pole shoe in the rotor during rotation.

As illustrated in FIG. 5, each pole shoe 2 also extends outwardly at longitudinal opposite ends thereof from the magnetic field pole body 1a. In spaces formed between longitudinal opposite end portions of the pole shoe 2 and the shaft body 1b, coils 4 are arranged. To prevent the pole shoe 2 from undergoing a bending deformation under centrifugal forces such that it curls up, the longitudinal opposite end portions of the pole shoe 2 are beveled to have a thinner thickness in this example. The coils 4 arranged in the above-described spaces are shorter compared with the coils 4 arranged in parallel with the longitudinal direction of the pole shoe 2.

Figure 6:
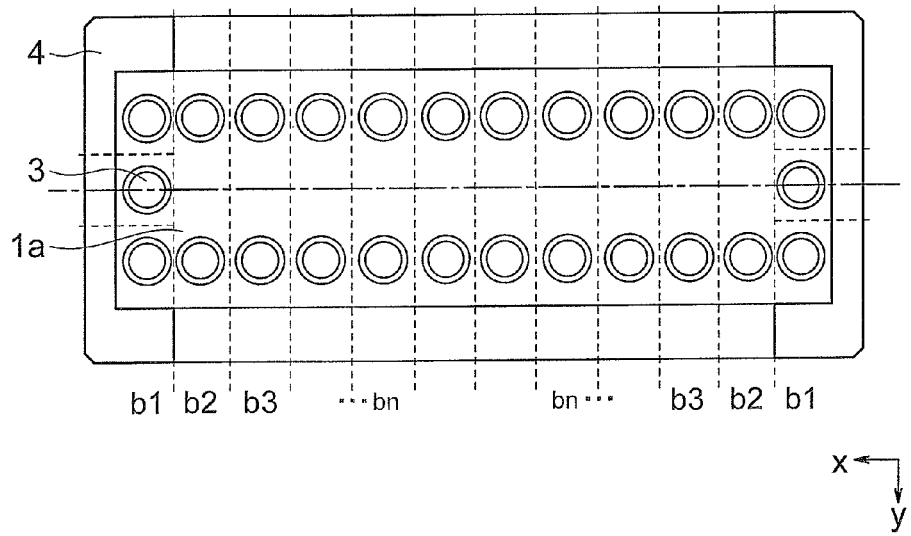
FIG. 6 is a top plan view of each magnetic field pole, without its pole shoe, in the rotor.

The rotor 1 is assembled by joining each pole shoe 2 to its corresponding magnetic field pole body 1a with bolts. Locations where the pole shoe 2 is joined with the bolts (which will hereinafter be referred to as "bolted joint portions") are arranged in at least two rows, bilaterally symmetrically with respect to the central axis of rotation indicated by an alternate long and short dash line in FIG. 6. With no intention to specifically restrict the present invention, it may be contemplated to arrange bolted joint portions at three or more locations in each of the opposite end portions of the pole shoe 2. As illustrated in FIG. 6, the bolted joint portions arranged in two or more rows in parallel to the central axis of rotation are aligned such that in each row, a line which connects the axial centers of the respective bolts extends straight in the direction of the x-axis. In the direction of the y-axis in FIG. 6, on the other hand, the bolted joint portions are similarly aligned such that they are arranged in a multiplicity of rows perpendicular to the central axis of rotation, and in each row, a line which connects the axial centers of the respective bolts extends straight.

The stator 7 is fabricated by stacking a plurality of magnetic steel sheets in the longitudinal direction of the axis of rotation. On an inner peripheral side of the stator 7, a plurality of teeth is formed to facilitate the winding of armature windings. Between the stator 7 and the rotor 1, there is a clearance to define a magnetic gap of an adequate width. The stator 7 and rotor 1 are substantially cylindrical, and are arranged opposite to each other such that their longitudinal centerlines coincide with each other.

To clarify the characteristic features of the electrical rotating machine according to the present invention, a description will first be made based on electrical rotating machines of conventional configurations.

Figure 8A:
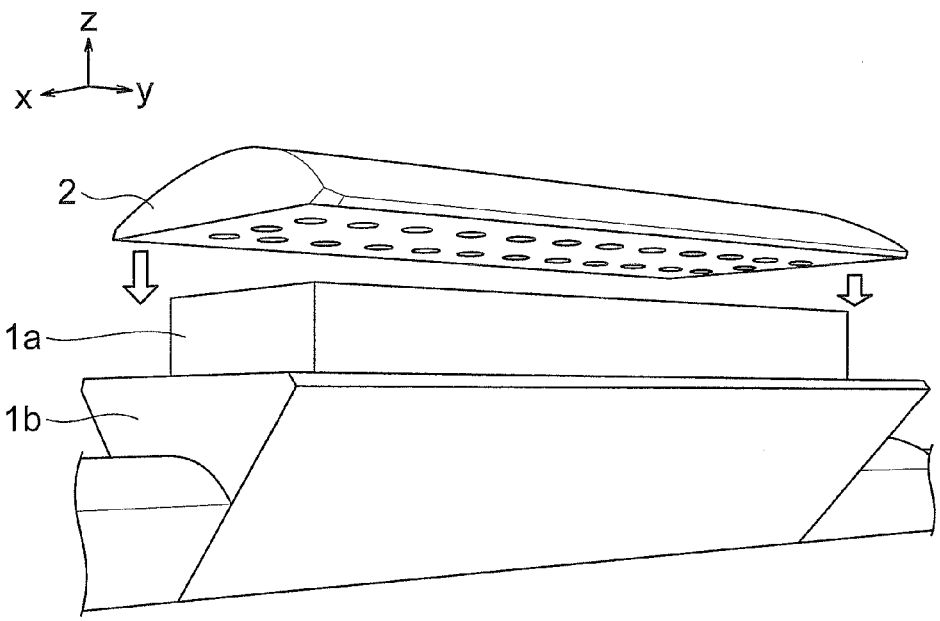
FIGS. 8A and 8B are views depicting an electrical rotating machine according to a first example of conventional configuration.
Figure 8B:
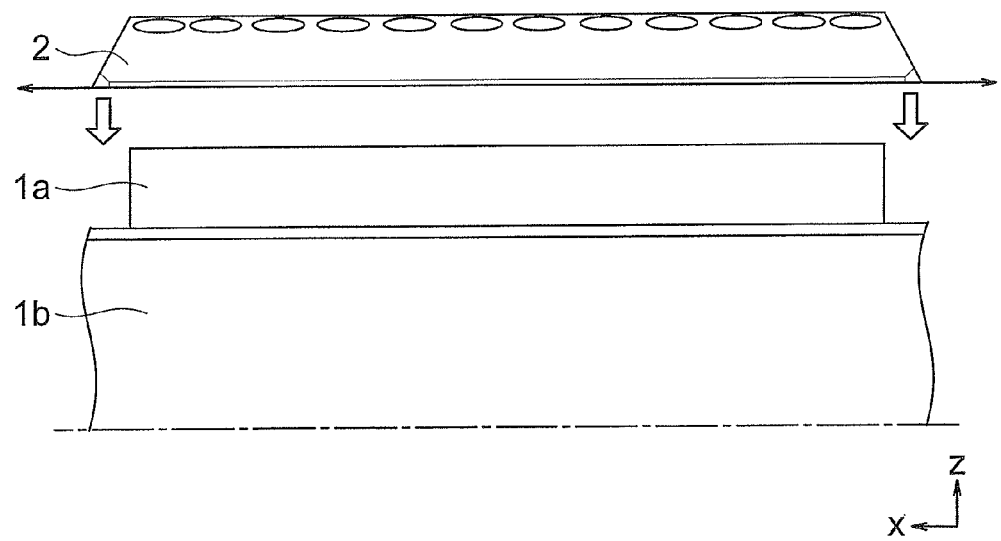
Figure 9A:
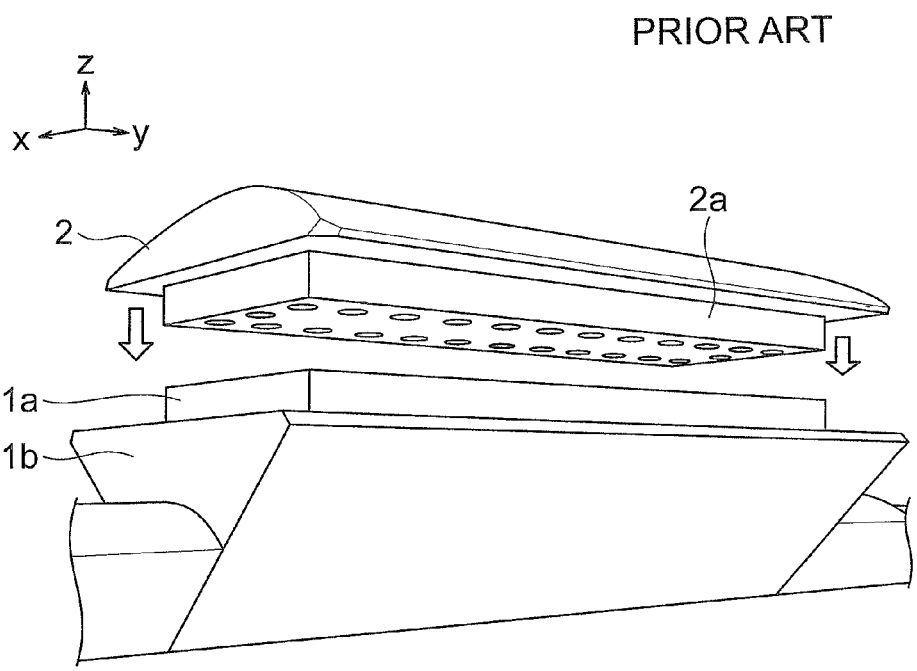
FIGS. 9A and 9B are views depicting an electrical rotating machine according to a second example of conventional configuration.
Figure 9B:
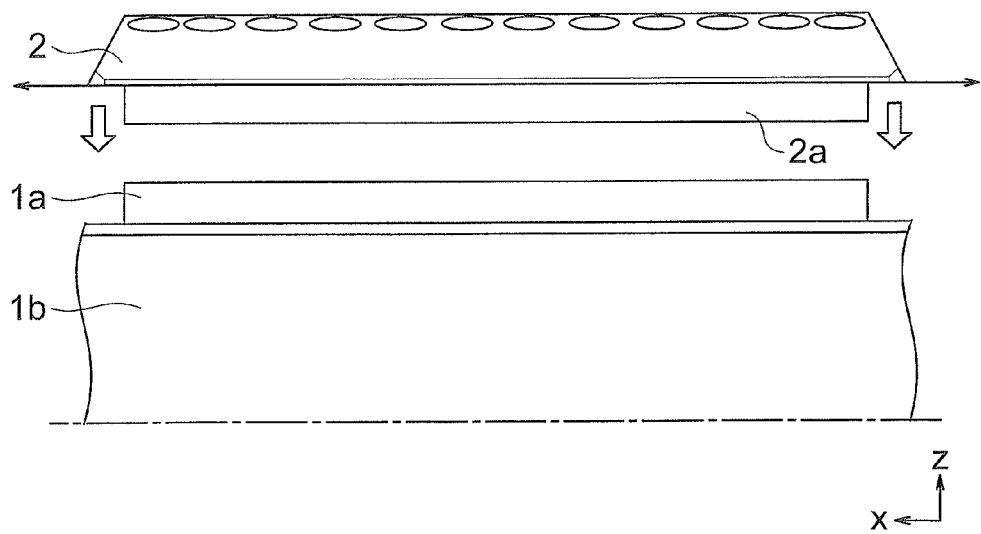

FIGS. 8A and 8B are views depicting an electrical rotating machine according to a first example of conventional configuration. FIGS. 9A and 9B are views depicting an electrical rotating machine according to a second example of conventional configuration. A pole shoe 2 in FIGS. 9A and 9B extends downward in the figures with the same rectangular cross-section. In the figures, the arrow marks indicate a direction in which the pole shoe 2 with plural through-holes formed therethrough for bolts is pressed against the magnetic field pole body 1a with a like plural number of threaded holes formed therein.

Figure 10A:
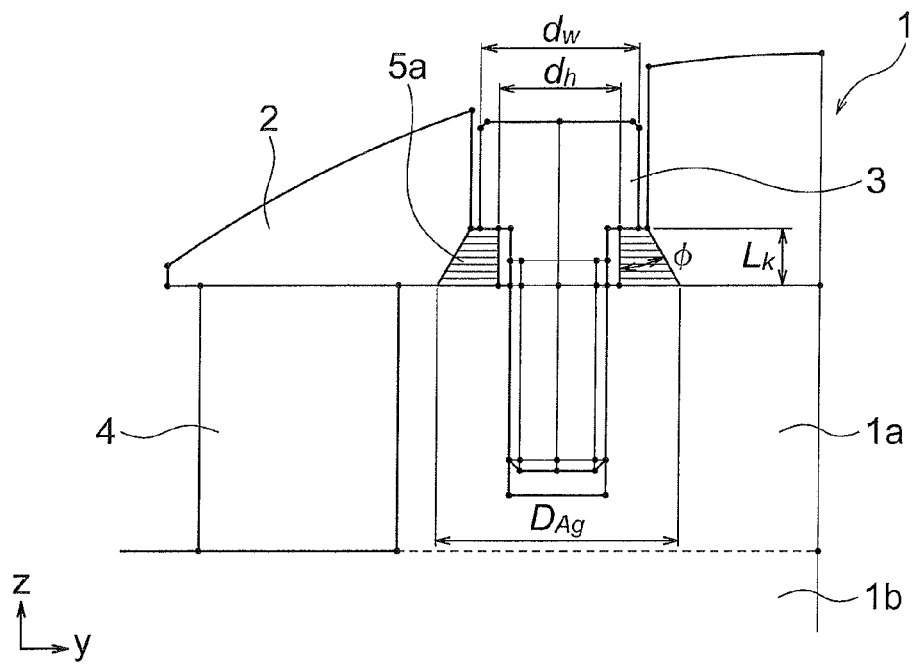
FIGS. 10A and 10B are explanatory diagrams of compression domains formed by joining with bolts.
Figure 10B:
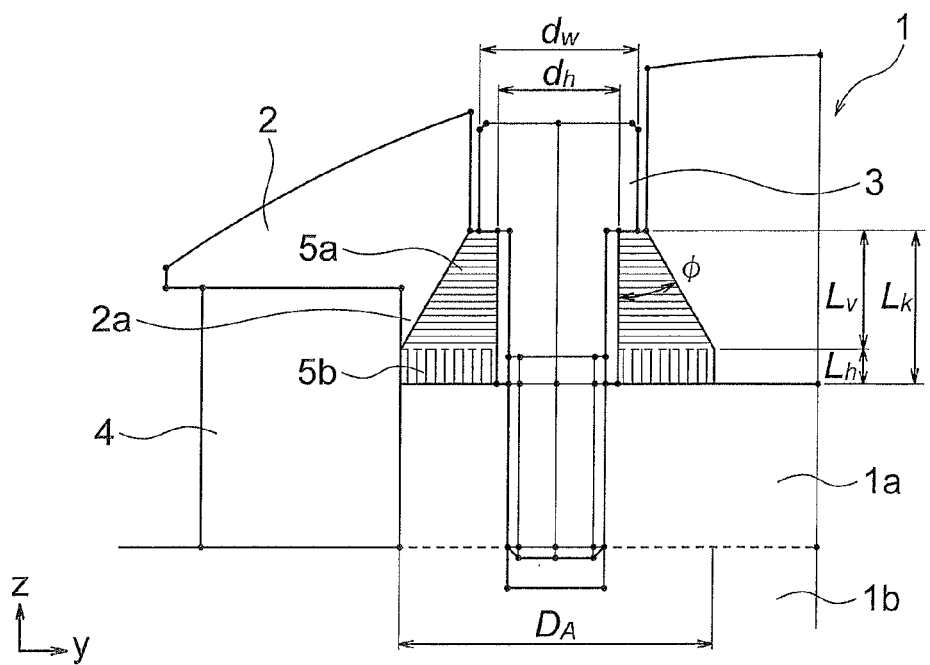

FIGS. 10A and 10B are cross-sectional views of one widthwise sides of pole shoes in each magnetic field poles of salient-pole rotors of two types, one having pole shoes 2 not extending downward and the other being provided with pole shoes 2 extending downward, taken along planes perpendicular to the axes of rotation, respectively. When a tightening force is applied to bolts 3, the bolts 3 are brought into a pulled state. The pole shoe 2, which is on the side to be joined, is brought into a compressed state, and therefore, the bolts 3 and the pole shoe 2 are brought into a dynamically balanced state. In the figures, domains where the pole shoes 2 bear compression loads occurred by the tightening (hereinafter referred to as "compression domains") are indicated.

As illustrated in FIGS. 10A and 10B, the compression domains are formed with surfaces, to which the bolts come into contact, on the sides of the pole shoes 2, 2 serving as origins. The compression domains first expand in conical forms (hereinafter called "the conically-shaped compression domains 5a, 5a"). When the conically-shaped compression domains 5a, 5a then reach a lower wall of the pole shoe 2 and an outer wall of a protrusion 2a formed on the pole shoe 2, respectively, the conically-shaped compression domains 5a, 5a do not expand any further. In FIG. 10B, however, the compression domain further expands in a cylindrical form (hereinafter called "the cylindrically-shaped compression domain 5b"). It is to be noted that in the figures, the conically-shaped compression domains 5a, 5a are indicated by horizontal lines while the cylindrically-shaped compression domain 5b is indicated by vertical lines. As apparent from a comparison of FIG. 10A and FIG. 10B, the compression domain can be enlarged when the pole shoe 2 is extended downward at the lower side thereof.

The height at which the compression domain changes from the conically-shaped compression domain to the cylindrically-shaped compression domain in FIG. 10B is determined by a conical angle φ and a distance from the axial center of the bolt to the outer wall of the protrusion 2a formed on the pole shoe 2 as indicated in the figure. It is to be noted that the conical angle φ is determined from the dimensions and stiffness of the pole shoe 2. In a threaded bolted joint used in the present invention, the maximum value of the conical angle may reach 45°. The signs $d_h$, $d_w$, $D_{Ag}$, $D_A$, $L_k$, $L_v$ and $L_h$ in FIGS. 10A and 10B represent the following dimensions:

$d_h$: Diameter of the hole formed for the unthreaded bolt shank through the pole shoe 2 in FIG. 10A; and diameter of the hole formed for the unthreaded bolt shank through the pole shoe 2 and protrusion 2a in FIG. 10B.

$d_w$: Diameter of the hole formed for the bolt head in the pole shoe 2.

$D_{Ag}$: Diameter of the conically-shaped compression domain 5a at the plane of the joint between the pole shoe 2 and the magnetic field pole body 1a.

$D_A$: Diameter of the conically-shaped compression domain 5a at the height where the conically-shaped compression domain 5a reaches the outer wall of the protrusion 2a.

$L_k$: Height of the compression domain (=the conically-shaped compression domain 5a) in FIG. 10A; and the height of the compression domain (=the conically-shaped compression domain 5a+the cylindrically-shaped compression domain 5b) in FIG. 10B.

$L_v$: Height of the conically-shaped compression domain 5a in FIG. 10B.

$L_h$: Height of the cylindrically-shaped compression domain 5b in FIG. 10B ($L_v+L_h=L_k$).

Upon application of a centrifugal force and a moment occurred under rotation, the loading factor of the bolt 3 is defined as the ratio of the stiffness of the bolt 3 to the sum of the stiffness of the bolt 3 and that of the pole shoe 2. Concerning the centrifugal force, the bearing factor of the bolt 3 is defined as the ratio of the pulling stiffness of the bolt 3 in the axial direction of the bolt 3 to the sum of the stiffness of the bolt 3 and that of the pole shoe 2. As to the moment, the bearing factor of the bolt 3 is defined as the ratio of the bending stiffness of the bolt 3 to the sum of the stiffness of the bolt 3 and that of the pole shoe 2.

For the reduction of the loading factor of the bolt 3, it is effective to lengthen the bolt 3 to lower its stiffness in the axial direction and also to increase the stiffness of the pole shoe 2. For the reduction of the moment bearing factor of the bolt 3, it is effective to enlarge the compression domain (the conically-shaped compression domain 5a, or the conically-shaped compression domain 5a+the cylindrically-shaped compression domain 5b) to be formed in the pole shoe 2 such that the pole shoe 2 is provided with greater bending stiffness. Preferably, the conically-shaped compression domain 5a or the cylindrically-shaped compression domain 5b may be set to have a maximum outer diameter at the height of the plane of a joint where the pole shoe 2 and magnetic field pole body 1a or the protrusion 2a formed on the pole shoe 2 and the magnetic field pole body 1a are in contact to each other. As a consequence, the pole shoe 2 is improved in second moment of area, leading to a reduction in the bending stress that is to occur on the bolt 3.

When the lower side of the pole shoe 2 is extended with the same height over the entire length of the axis of rotation as illustrated in FIG. 9A, 9B or 10B, the mass of the whole pole shoe increases, leading to an increase in the centrifugal force to be borne in the axial direction by the bolt 3. When the number of bolts is increased or bolts of greater diameter are used, on the other hand, the load to be borne by each bolt 3 is reduced. However, the bolted joint portions come close to each other. A high stress, therefore, occurs at narrow portions flanked by the bolted joint portions b1 and b2 (see FIGS. 5 and 6) of the pole shoe 2, thereby raising a potential problem that such an approach may lead to a reduction in the strength of the pole shoe 2. Further, the longitudinal opposite end portions of the pole shoe 2 are formed thinner to reduce a centrifugal force, so that a larger stress occurs at the opposite end portions than at the central part. There is, accordingly, an increased possibility of breakage of the pole shoe 2 at the longitudinal opposite end portions thereof.

The present invention has been made to solve the above-described problems, and embodiments of the electrical rotating machine according to the present invention will hereinafter be described in the following examples. It is, however, to be noted that the following description will concentrate only on rotors as their combined stators can be of a conventional configuration.

EXAMPLE 1

Figure 11A:
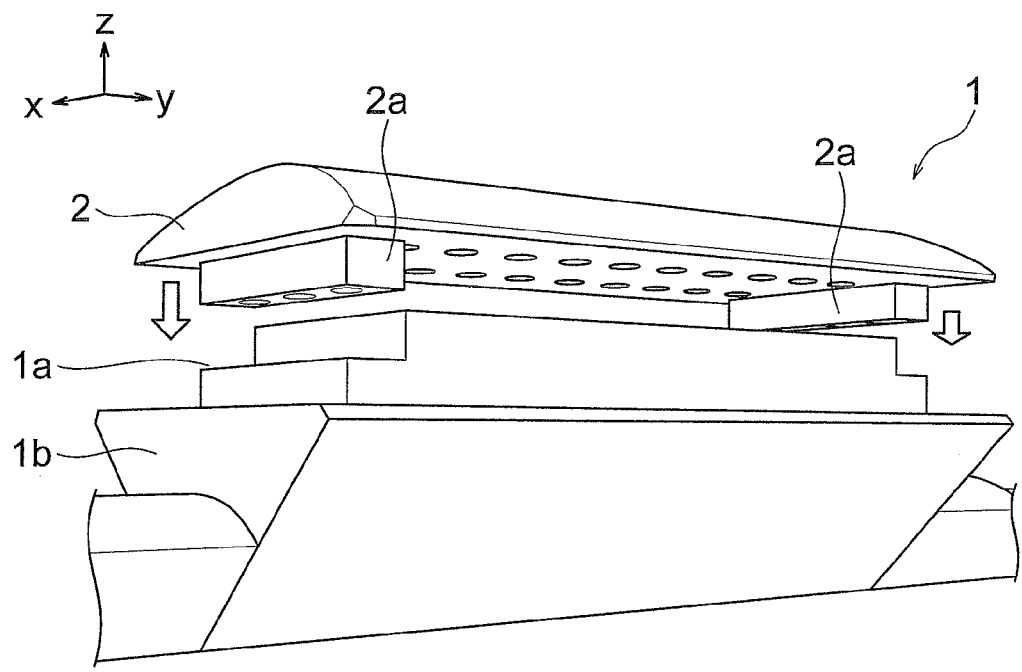
FIGS. 11A and 11B are partial configuration diagrams of an electrical rotating machine of Example 1.
Figure 11B:
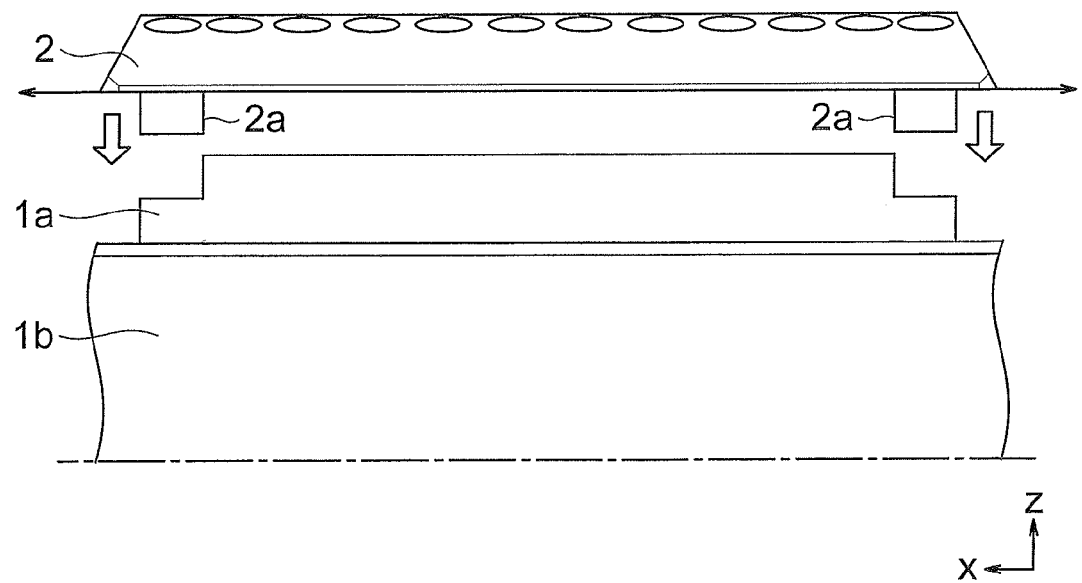

FIG. 11A is a perspective view of a shaft body 1b, a magnetic field pole body 1a, and a pole shoe 2 in a salient-pole rotor 1 of Example 1. On the other hand, FIG. 11B is a side view of the shaft body 1b, magnetic field pole body 1a and pole shoe 2. As apparent from these figures, the salient-pole rotor 1 of Example 1 is characterized in that only at opposite longitudinal end portions of the pole shoe 2, protrusions 2a are formed extending downward with the same rectangular cross-section relative to a central part of the pole shoe 2 to provide the pole shoe 2 with improved second moment of area. These protrusions 2a can reduce bending stresses on the bolts 3 in the opposite end portions of the pole shoe 2, said bending stresses being to occur due to a deviation of a centrifugal force, and therefore, can prevent breakage of the bolts 3.

In this example, the pole shoe 2 can be made lighter compared with the conventional configuration. This example can, therefore, reduce an increase in overall centrifugal force. As illustrated in FIGS. 11A and 11B, the pole shoe 2 has a bilaterally symmetric structure. Bolted joint portions arranged in two rows in parallel to the axis of rotation are aligned such that in each row, a line which connects the axial centers of the respective bolts extends straight in the direction of the x-axis. In the direction of the y-axis in FIG. 11A, on the other hand, the bolted joint portions are aligned likewise. Accordingly, the pole shoe 2 has a bilaterally symmetric structure in both a cross-section perpendicular to the axis of rotation and a cross-section parallel to the axis of rotation. Owing to the existence of no deviation in mass, the pole shoe 2 itself does not undergo much bending or twisting.

In this example, the height ($L_k$ in FIG. 10B) from a lower wall of each protrusion 2a of the pole shoe 2 to the bearing surface for each corresponding bolt may preferably be set equal to the diameter of the bearing surface for the bolt or so. In this case, the conically-shaped compression domain 5a can be maximized by also setting the distance from the axial centerline of the bolt to an outer wall (on the left side in FIG. 10B) of the magnetic field pole body 1a equal to the diameter of the bearing surface for the bolt or so.

When the distance from the axial centerline of each bolt to the outer wall of the magnetic field pole body 1a is progressively shortened, the magnetic field pole body 1a becomes thinner on the side of the outer wall relative to the threaded hole (on the left side in FIG. 10B). In this example, however, the distance from the axial centerline of each bolt to the outer wall (on the left side in FIG. 10B) of the magnetic field pole body 1a is also set equal to the diameter of the bearing surface for the bolt or so, and therefore, there is no much potential problem of a localized reduction in the strength of the threaded hole.

Further, the dimension in the longitudinal direction of the axis of rotation of each protrusion 2a, which extends from the pole shoe 2—as measured from the adjacent longitudinal end of the magnetic field pole body 1a—may be set preferably at a dimension that the compression domain at the height of the plane of a joint between the pole shoe 2 and the magnetic field pole body 1a has a maximum outer diameter. However, the compression domain of the bolted joint portion b1 on the longitudinal outermost side of the axis of rotation and that of the bolted joint portion b2 closer by one bolted joint portion toward the central part of the pole shoe 2 may partly overlap each other when they come close to each other (see FIGS. 5 and 6). In such a case, the protrusion 2a may be formed with a rectangular cross-section such that its outer shape is located at the position of a bisector (a vertical dashed line in FIG. 6) of a narrow portion of the pole shoe 2 between the bolted joint portions b1 and b2. This configuration can maximize the compression domains of the bolted joint portions b1, b2.

EXAMPLE 2

Figure 12A:
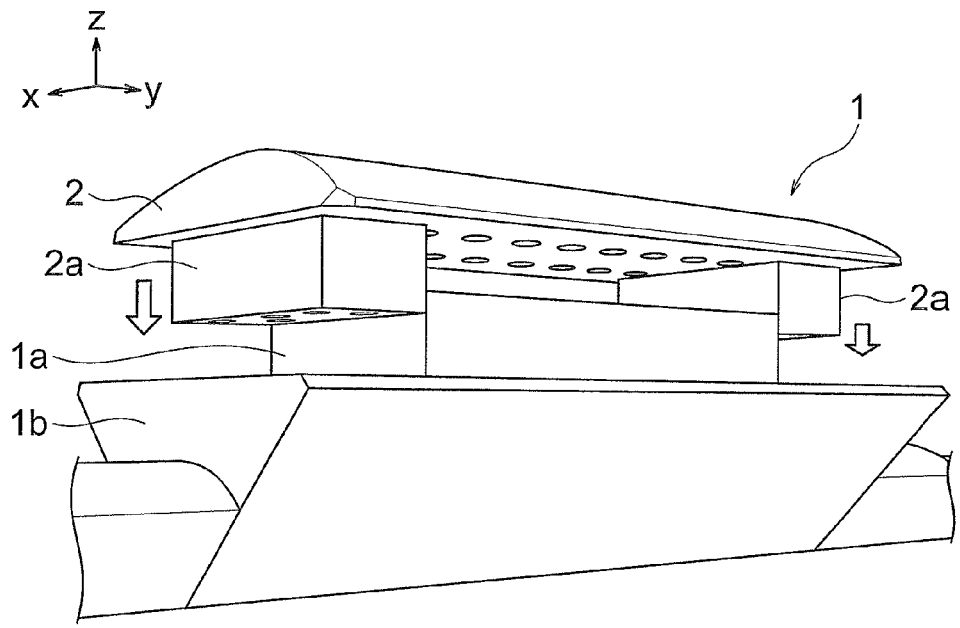
FIGS. 12A and 12B are partial configuration diagrams of an electrical rotating machine of Example 2.
Figure 12B:
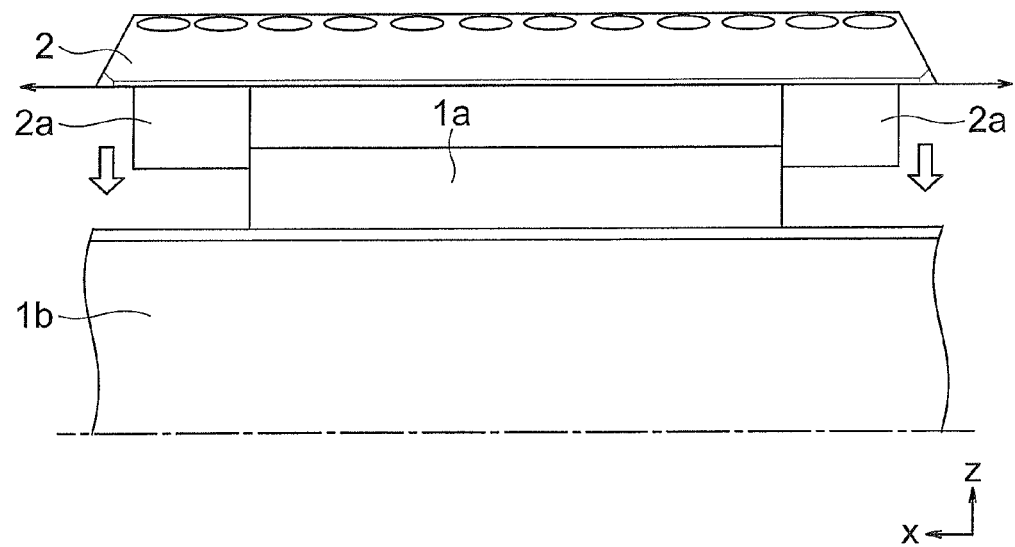

FIG. 12A is a perspective view of a magnetic field pole body 1a and a pole shoe 2 in a salient-pole rotor 1 of Example 2. On the other hand, FIG. 12B is a side view of magnetic field pole body 1a and pole shoe 2. The salient-pole rotor of Example 2 is characterized in that different from the salient-pole rotor of Example 1, a wider protrusion 2a extends not only on a lower side of the bolted joint portion b1 but also on a lower side of the bolted joint portion b2, both, on the side of each longitudinal end portion of the pole shoe 2 (see FIGS. 5 and 6).

It is to be noted that in the present invention, the bolted joint portions included in each row at an area where each protrusion 2a extends are not intended to be limited only to two locations and each protrusion 2a may be arranged from the corresponding longitudinal end portion of the pole shoe 2 to the area where an $n^{th}$ (n: an integer of 1 or greater) bolted joint portion is included. However, the mass of the whole pole shoe 2 increases as the protrusions 2a become longer in the longitudinal direction of the pole shoe 2. The number of n is, therefore, determined through a comparative consideration of the effect available from an enlargement of the compression domains and the extent of a deformation of the pole shoe 2 due to an increase in its mass.

EXAMPLE 3

Figure 13A:
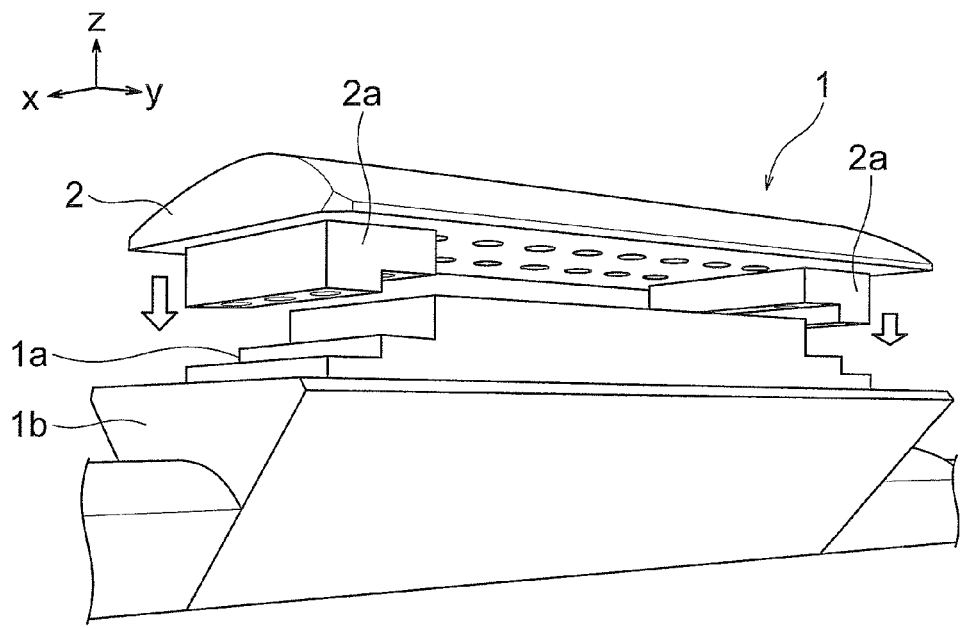
FIGS. 13A and 13B are partial configuration diagrams of an electrical rotating machine of Example 3.
Figure 13B:
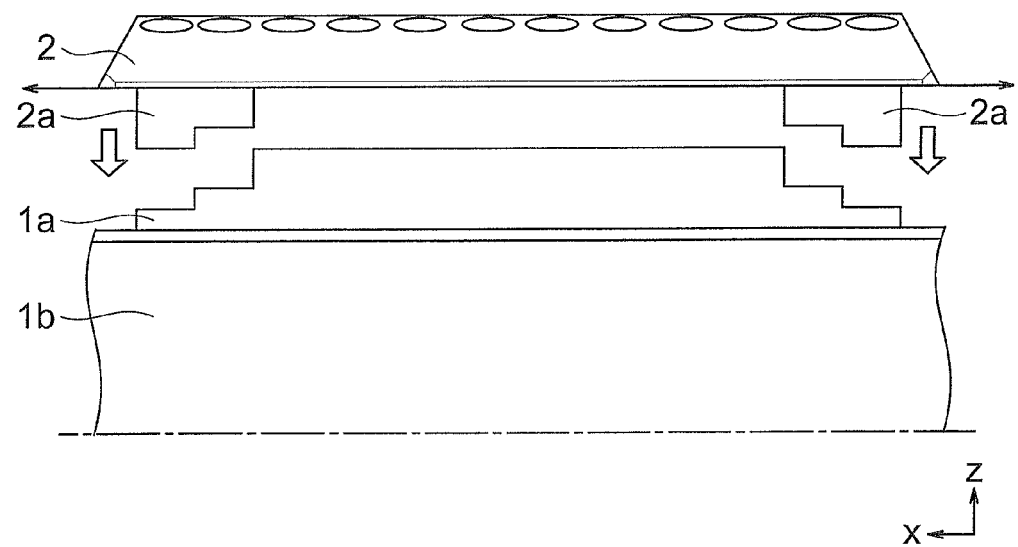

FIG. 13A is a perspective view of a magnetic field pole body 1a and a pole shoe 2 in a salient-pole rotor 1 of Example 3. On the other hand, FIG. 13B is a side view of magnetic field pole body 1a and pole shoe 2. The salient-pole rotor of this example is characterized in that the height dimensions of protrusions 2a, which extend downward from the pole shoe 2, are lowered stepwise from opposite longitudinal end portions of the pole shoe 2 toward a central part of the pole shoe 2, in other words, as the distances from the opposite longitudinal end portions of the pole shoe 2 increase. As described above, the bolted joint portions included in each row at an area where each protrusion 2a extends downward are not intended to be limited only to two locations in this example. Each protrusion 2a may be arranged from the corresponding longitudinal end portion of the pole shoe 2 to the area where an $n^{th}$ (n: an integer of 1 or greater) bolted joint portion is included, and the height dimensions of protrusions 2a, which extend downward from the pole shoe 2, are lowered stepwise from opposite longitudinal end portions of the pole shoe 2 toward a central part of the pole shoe 2.

In such a case that the ratio of the length of the magnetic field pole body 1a in the direction of the x-axis to the width of the magnetic field pole body 1a in the direction of the y-axis is great, the mass of the whole pole shoe 2, therefore, does not increase compared to the conventional configuration. Further, it is possible to stepwise adjust, in the longitudinal direction of the axis of rotation, a bending stress that occurs on each bolt 3, and also, such a bending deformation that would cause curling-up of the pole shoe 2.

EXAMPLE 4

Figure 14A:
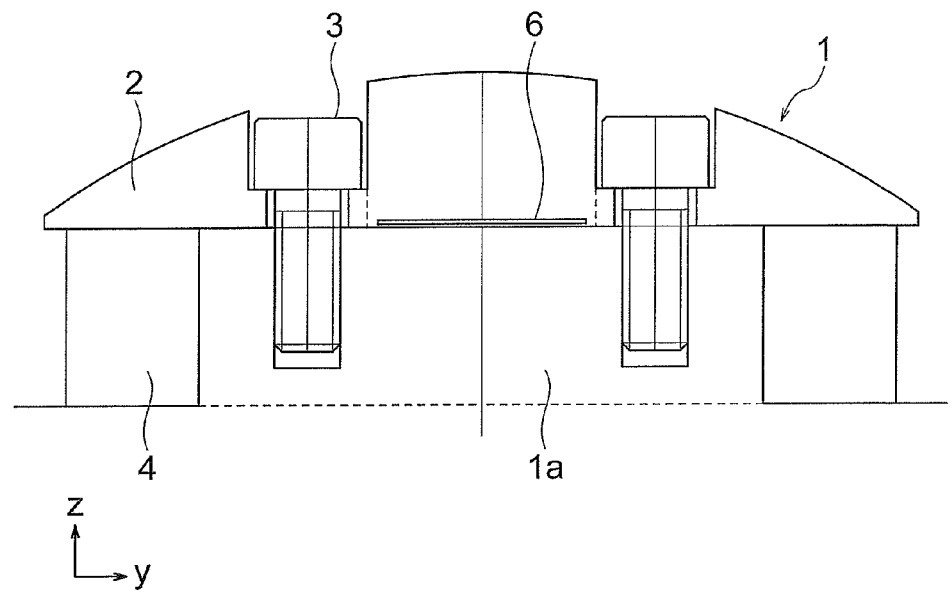
FIGS. 14A and 14B are partial configuration diagrams of electrically rotating machines of Example 4.
Figure 14B:
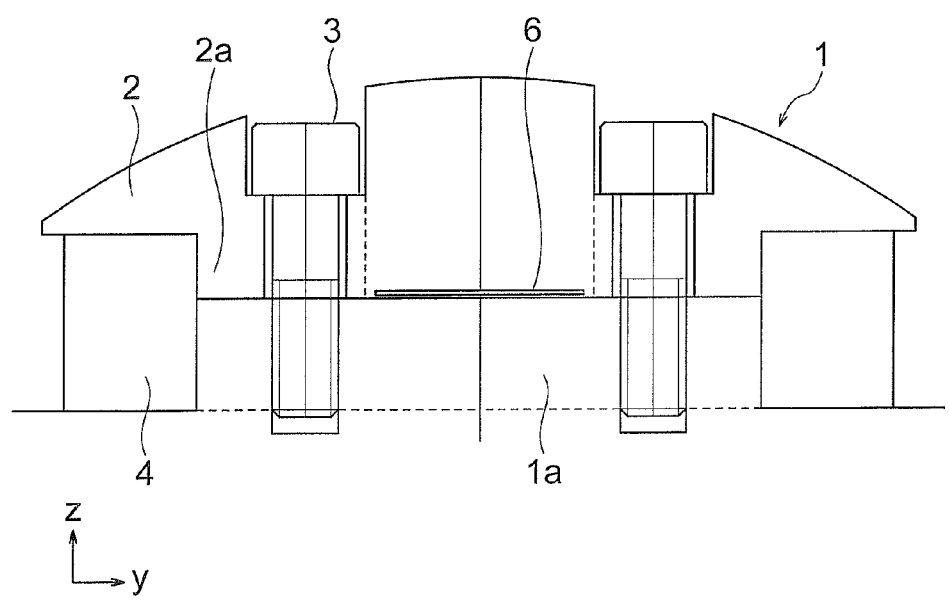

FIGS. 14A and 14B are schematic diagrams of salient-pole rotors 1, 1 of Example 4 in cross-sections perpendicular to the axes of rotation. No rectangular protrusion is arranged on a lower wall of a pole shoe 2 in FIG. 14A, while a rectangular protrusion 2a is arranged on a lower wall of a pole shoe 2 in FIG. 14B. The salient-pole rotor 1 of FIG. 14A is characterized in that at the plane of a joint between a magnetic field pole body 1a and the pole shoe 2, a clearance of small height is formed as a recess 6 at an intermediate part between each combination of bolted joint portions, which are adjacent to each other in a widthwise direction of the pole shoe 2 with respect to a longitudinal centerline of the pole shoe 2. The recess 6 illustrated in the figure may be arranged either on the side of the magnetic field pole body 1a or on the side of the pole shoe 2. Preferably, however, the recess 6 may be arranged on the side of the pole shoe 2 for a reduction in the mass of the whole pole shoe 2. The salient-pole rotor 1 of FIG. 14B is similar to the salient-pole rotor 1 of FIG. 14A, but is different from the salient-pole rotor 1 of FIG. 14A in that the rectangular protrusion 2a is arranged on the lower wall of the pole shoe 2 as described above, and also, in that at the plane of a joint between a magnetic field pole body 1a and the rectangular protrusion 2a, a clearance of small height is formed as a recess 6 between each combination of bolted joint portions, which are adjacent to each other in a widthwise direction of the pole shoe 2 with respect to a longitudinal centerline of the pole shoe 2.

The dimension of the recess 6 in the direction of the y-axis in FIG. 14A or 14B may preferably be set such that the recess is formed in a range indicated in the figure by two dashed lines extending straight downward from inner ends, as viewed in the direction of the y-axis, of respective bearing surfaces on the side of the pole shoe, with which the associated bolts 3 are in contact. If the dimension in the direction of the y-axis of the recess is set greater than the above-mentioned preferred dimension, the compression domain of each bolted joint portion becomes smaller, and hence, a greater bending stress occurs on the corresponding bolt.

EXAMPLE 5

Figure 15A:
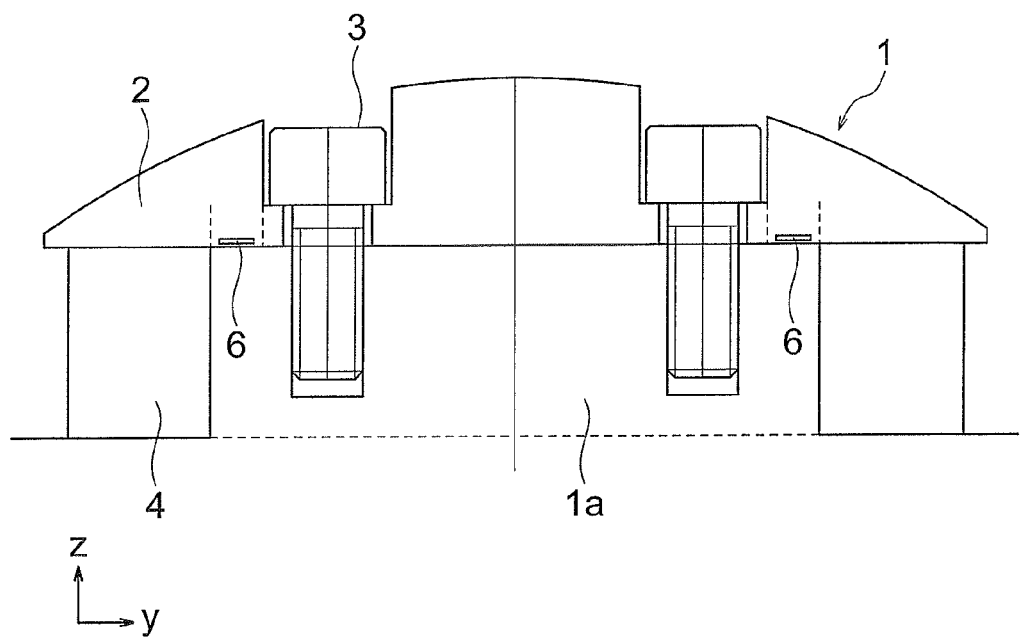
FIGS. 15A and 15B are partial configuration diagrams of electrically rotating machines of Example 5.
Figure 15B:
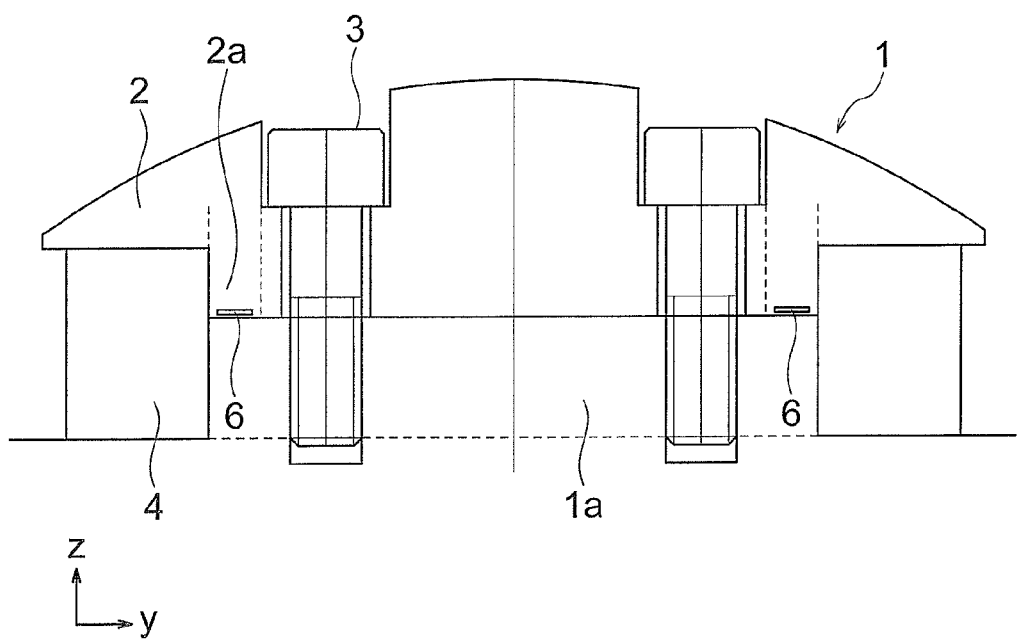

FIGS. 15A and 15B are schematic diagrams of cross-sections of salient-pole rotors 1, 1 of Example 5 perpendicular to the central axes of rotation. No rectangular protrusion is arranged on a lower wall of a pole shoe 2 in FIG. 15A, while a rectangular protrusion 2a is arranged on a lower wall of a pole shoe 2 in FIG. 15B. The salient-pole rotor 1 of FIG. 15A is characterized in that clearances of small height are formed as recesses 6, 6 on respective widthwise outer sides of each center of bolt axis, which are adjacent to each other in a widthwise direction of the pole shoe 2 with respect to a longitudinal centerline of the pole shoe 2. The dimension of each recess 6 in the direction of the y-axis in FIG. 15A may preferably be set such that the recess 6 is formed in a range between a dashed line extending straight downward from an inner end, as viewed in the direction of the y-axis, of a bearing surface on the side of the pole shoe 2, with which the associated bolt 3 is in contact, and a proximal side wall of a magnetic field pole body 1a. If the dimension in the direction of the y-axis of the recess 6 is set greater than the above-mentioned preferred dimension, the compression domain of each bolted joint portion becomes smaller, and hence, a greater bending stress occurs on the corresponding bolt. The salient-pole rotor 1 of FIG. 15B is similar to the salient-pole rotor 1 of FIG. 15A, but is different from the salient-pole rotor 1 of FIG. 15A in that the rectangular protrusion 2a is arranged on the lower wall of the pole shoe 2 as described above, and also, clearances of small height are formed as recesses 6, 6 between each combination of bolted joint portions adjacent to each other in a widthwise direction of the pole shoe 2.

The electrical rotating machines provided with the salient-pole rotors of Examples 4 and 5, respectively, can each make the contact pressure higher at the height position of the plane of the joint between the pole shoe and the magnetic field pole body, and therefore, can each suppress the occurrence of their separation at the plane of the joint. Therefore, the embodiments of Examples 4 and 5 can each be applied preferably to locations where a pole shoe and its associated magnetic field pole body have become prone to separation at the plane of the joint therebetween due to the outward extension of the pole shoe from the magnetic field pole body in both the longitudinal and widthwise directions of the pole shoe. As a consequence, it is possible to achieve both a reduction in a bending stress on each bolt and suppression of the separation of a pole shoe and its associated magnetic field pole body at the plane of a joint therebetween.

As has been described above, the present invention can avoid an increase in the mass of whole pole shoes and also to avoid the fracture of bolts or the breakage of the pole shoes, so that a salient-pole rotor of higher strength and longer service life can be realized. Moreover, it is possible to reduce such a bending deformation that would cause curling-up of the pole shoes. A large-capacity and high-efficiency synchronous machine can be realized accordingly.

The invention claimed is:

1. An electrical rotating machine provided with a salient-pole rotor composed of magnetic field pole bodies integrally formed with a shaft and pole shoes constituting magnetic field pole heads, each pole shoe being fixedly joined on the corresponding one of the magnetic field pole bodies with a plurality of bolts, wherein:
    each pole shoe or its corresponding magnetic field pole body is provided with at least one protrusion or recess for restricting a conically-shaped compression domain in a compression domain that occurs in the pole shoe when the pole shoe is joined on the corresponding magnetic field pole body with the bolts,
    each pole shoe is provided, on the lower wall thereof on sides of opposite ends in a longitudinal direction thereof, with rectangular protrusions, respectively, which are of the same shape and size and each define at least one through-hole for the corresponding one of the bolts,
    each rectangular protrusion has, in the longitudinal direction of the pole shoe, a dimension that allows corresponding two or more of the bolts to extend therethrough, and
    each rectangular protrusion is in a stepped shape of a height dimension that decreases stepwise with an increasing distance from the corresponding end of the pole shoe in the longitudinal direction.

2. The electrical rotating machine according to claim 1, wherein:
    the plurality of bolts are aligned in at least two parallel rows and along a central axis of the shaft, and
    the recess is formed at an intermediate part between adjacent two ones of the at least two parallel rows of bolts.

3. The electrical rotating machine according to claim 1, wherein:
    the plurality of bolts are aligned in at least one row and along a central axis of the shaft,
    the recess is formed at an intermediate part between the row of bolts and one of widthwise opposite sides of the pole shoe.

* * * * *